April 20, 1943.  M. R. WESTOVER  2,317,158
FLEXIBLE SHAFT HAMMER
Filed July 9, 1941  2 Sheets-Sheet 1
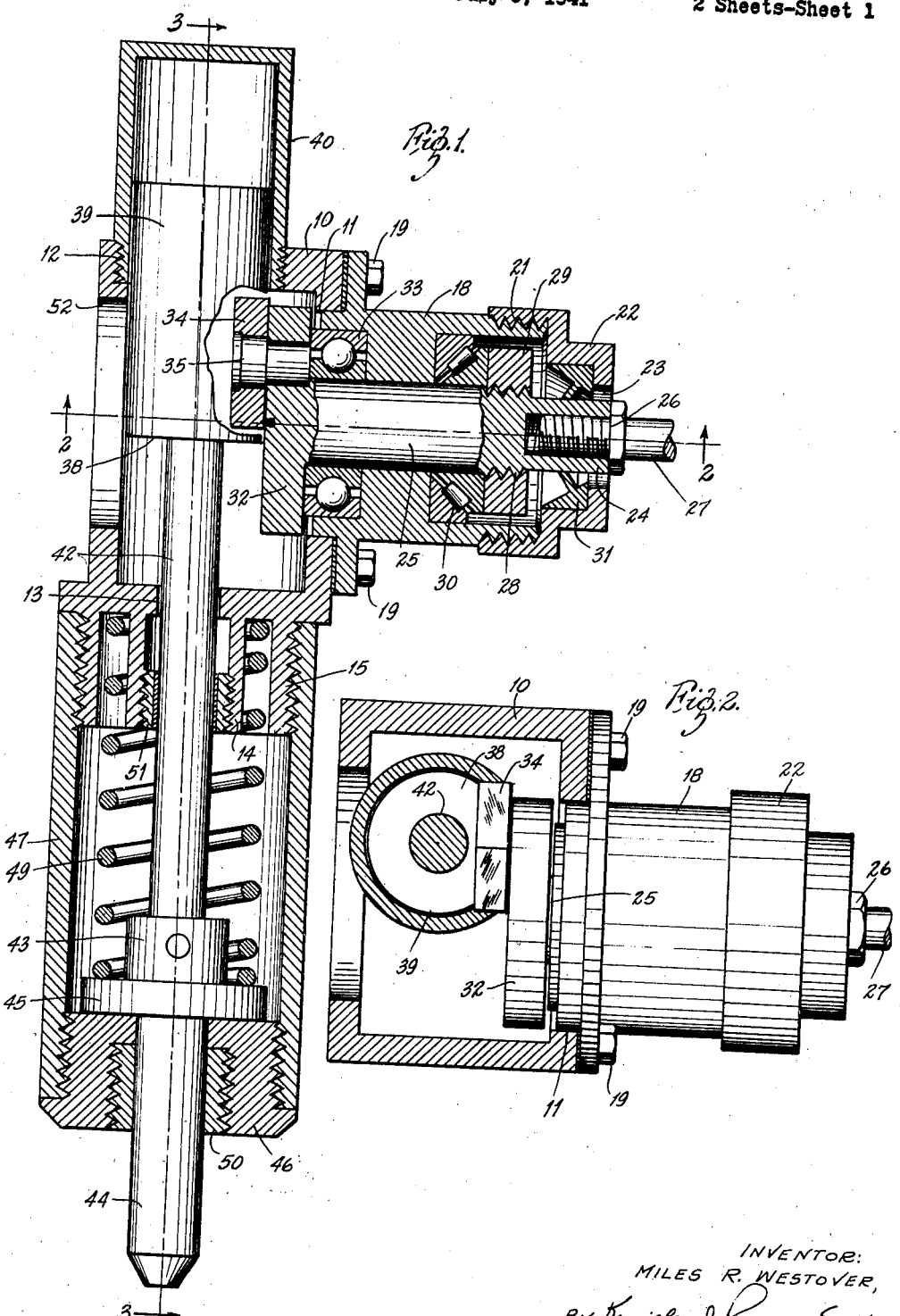
INVENTOR:
MILES R. WESTOVER,
By Kingsland Rogers & Ezell
ATTORNEYS.

April 20, 1943.　　M. R. WESTOVER　　2,317,158
FLEXIBLE SHAFT HAMMER
Filed July 9, 1941　　2 Sheets-Sheet 2
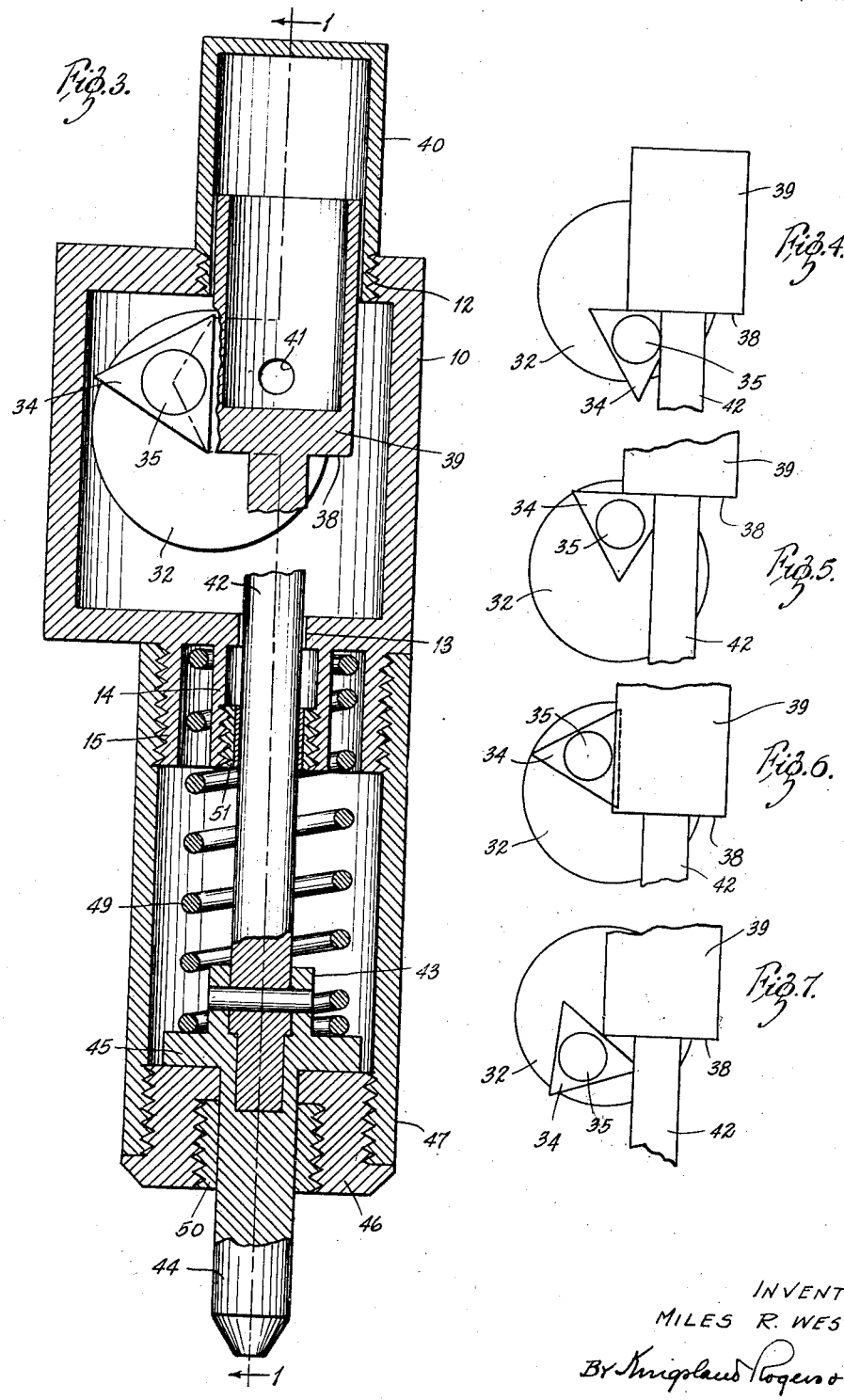
INVENTOR:
MILES R. WESTOVER,
By Kingsland Rogers & Ezell
ATTORNEYS.

Patented Apr. 20, 1943

2,317,158

UNITED STATES PATENT OFFICE 2,317,158

FLEXIBLE SHAFT HAMMER

Miles R. Westover, Alton, Ill.

Application July 9, 1941, Serial No. 401,628

10 Claims. (Cl. 125—33)

The present invention relates to a take-off mechanism, particularly adapted for use with a flexible shaft, and applicable to such uses as providing a hammer.

In general, the mechanism consists of a drive shaft adapted for connection with a flexible shaft or power driven member, a peculiarly shaped cam eccentrically mounted to operate on a reciprocable shaft by surface contact with a head thereon, return means to provide the hammer impact, with a dash pot, for governing the reciprocable motion.

Broadly, the object of the invention is to provide a take-off mechanism of this kind. More particularly, the objects are to provide a take-off mechanism having a surface contact between a rotary member and the reciprocable member to distribute the forces and to reduce wear; to provide a displaceable and preferably rotatable driven member which moves under the lateral component of motion of the cam so as to reduce wear.

A further object is to provide a mechanism of this kind designed to reduce the heat produced in the changing of the rotary motion to reciprocable motion.

A further object is to provide a device of this kind in which full movement of the reciprocating member is permitted to prevent breakage during abnormal operations.

Other objects will appear from the accompanying drawings and descriptions.

In the drawings:

Fig. 1 is a medial section, partly broken away, through the device;

Fig. 2 is a section taken on the line 2—2 of Fig. 1;

Fig. 3 is a section on the line 3—3 of Fig. 2 with a slight offset from the axis to show the cam, and with the cam slightly displaced for clarity; and, Figs. 4, 5, 6 and 7 are more or less diagrammatic views of the cam and reciprocating member in successive positions.

The mechanism includes a main housing 10. This housing has an opening 11 in one side thereof, and an internally threaded opening 12 in one end which may for purposes of this description be called the upper end. In the opposite end, which may be called the lower end, there is a wall penetrated by an opening 13. The outside of this wall is, in turn, provided with a circular and internally threaded flange 14 and a larger externally threaded flange 15 spaced therefrom. The openings 12 and 13 and the flanges 14 and 15 are concentric to the same axis.

A bearing and drive shaft housing 18 projects within the opening 11. It has a flange engaging the drive shaft housing 10 and it is held to the housing by means of bolts 19, or the like.

The drive shaft housing 18 is externally threaded at 21 on its outer end to receive a cap 22. This cap has a center opening 23 axially thereof from which extends an internally threaded end 24 of a drive shaft 25, the internally threaded portion of which is adapted to receive a fitting 26 of the flexible shaft member 27. The shaft 25 has also an externally threaded portion 28 terminating in a shoulder and which receives a locking nut 29 for a tapered thrust bearing 30. This thrust bearing absorbs end thrust inwardly or to the left, in Fig. 1. The cap 22 holds a seal 31 having a resilient cone sealing edge against the shaft.

The shaft 25 at its inner end is enlarged radially to provide a disc 32. Adjacent the disc there is provided a radial bearing 33, the outer edge of which is supported in the housing 18.

Eccentrically mounted on the disc 32 is a triangular cam 34 freely rotatably mounted upon a stud 35 secured to the disc. The stud has a flange to hold the cam thereon and is fixed to the disc by some suitable way, such as by shrinking. Of course a frictionless bearing could be used here if desired.

The cam acts against a lower surface 38 of a plunger or piston 39 adapted to act in a cylinder 40 to form a dash pot. The cylinder 40 is threaded into the opening 12 within the housing. The piston has a relief port 41 in the lower part thereof.

Secured to or integral with the piston 39 is a reciprocable driven shaft 42 that projects through the opening 13 in the housing and at its lower end fits into a socket within the head 43 of a hammer member 44, wherein it is held by a pin as shown in Fig. 3. The hammer member has a flange 45 adapted to engage against a cap 46 threaded into the outer end of a casing 47, the inner end of which engages over the flange 15. A coil spring 49 surrounds the shaft 42 and engages against the housing 10 between the flanges 14 and 15, and also against the flange 45 to urge this flange, and with it the shaft 42 and the hammer head 44 downwardly, or outwardly. A bearing ring 50 surrounds the hammer member 44 and is threaded within the cap 46. A similar bearing ring 51, which may hold packing, is threaded into the flange 14.

In use, the flexible shaft 27 causes rotation of the drive shaft 25. This, in turn, rotates the disc 32 and with it the cam 34. The downward position of the hammer is shown in Figs. 1 and 3, and in it the lower end 38 of the piston 39 is approximately disposed at least high enough to insure that as the cam hits the edge of the piston, the forces will rotate the cam counterclockwise about the stud 35 so that an edge of the cam will engage flatly on the surface 38. By this means, as the cam rotates one of its bases will ride from approximately the position shown in Fig. 7 until the lateral component of friction acting upon the triangle shifts it so that the particular side engages with the surface contacting against the head 38 of the piston.

As the cam proceeds counterclockwise in Fig. 7, it thus turns until one of the flat surfaces engages against the head 38 of the piston. Thereupon, it displaces the piston vertically, its force being distributed over the entire contact of the two surfaces.

The lateral component of the motion of the cam across the surface 38 may cause a turning motion of the piston and of the associated parts, which are rotatable about their axis. This freedom of the piston to rotate reduces not only wear by the reduction of friction, but also reduces heat by the same reduction and by the distribution of the heat over the lower surface 38, rather than over a very small part thereof.

This lateral motion is reversed in direction after the cam passes the horizontal. Thereupon, a reversal of the rotary motion may occur. It will be noted that the contact is a surface contact however.

When the cam passes from the position shown in Fig. 5, the return force of the spring 49 acts to rotate the cam clockwise around the edge of the surface 38. This rotation reduces the wear and the generation of heat in the release movement. When the piston is completely released, the cam is in the position of Fig. 6, and the piston returns for the hammer stroke. In this any contact of the cam is distributed along the piston and over a long edge of the cam. Thereupon, the cam continues its rotation counterclockwise until it returns to the position of Fig. 7, for a subsequent stroke.

With this type of construction, the drive shaft 25 may rotate at a high rate of speed without undue wear upon the parts and without the generation of excessive heat, two problems heretofore highly critical in devices of this kind, especially with remote power communicated through a flexible shaft. The housing 10 is preferably filled with oil through a suitable opening 52, having a removable cover not shown. This oil is kept from escaping by means of the packing 51 and the bearing 50. It is prevented from escaping from the member 18 by the sealing ring 31 which has a flexible cone engaging the shaft.

The dash pot controls the stroke so as to provide some cushioning of it to limit wear upon the mechanism.

The mechanism may be readily disassembled, as is apparent, for the purpose of servicing it or its various elements.

What is claimed is:

1. In a mechanism of the kind described, a rotatable drive shaft, a reciprocable member adapted to be reciprocated by rotation of the drive shaft, and force transmitting means between the two comprising a rotary member on one adapted to engage the other with a surface contact, and the other having a surface thereon to be contacted, said rotary member comprising a rotatable element eccentrically mounted upon the drive shaft and rotatable about an axis eccentric to the drive shaft axis and having a surface adapted to engage with the reciprocating member, said axis being positioned to describe, during the rotation, a circle that intersects the surface to be contacted during some point in the reciprocation of the latter.

2. In a mechanism of the kind described, a drive shaft adapted to be rotated, a rotatable cam eccentrically mounted on the drive shaft to be rotated thereby and to rotate about its eccentric mounting, a reciprocable member having a surface adapted to be engaged by the cam upon rotation of the shaft, the cam having a plurality of separate surfaces on its periphery any one of which is adapted to be brought into engagement with the surface of the reciprocable member upon rotation of the drive shaft to displace the reciprocable member by surface contact.

3. In a mechanism of the kind described, a drive shaft, a cam eccentrically mounted on the drive shaft for rotation thereby and rotatably mounted for rotation about its own axis, said cam being triangular to provide three cam surfaces, a reciprocable member having a surface to be engaged by said cam, said reciprocable member being disposed adjacent the cam so that said cam may in its rotation cause one of its surfaces to engage the surface of the reciprocable member and to displace the reciprocable member while maintaining a surface engagement therewith.

4. In a mechanism of the kind described, a housing, a reciprocable member within the housing and driven means extending from the housing to be operated, by the reciprocable member, a drive shaft, a portion of which is flexible to be driven by a remote power source, a cam eccentrically mounted on the drive shaft within the housing, means mounting said cam thus on the drive shaft for rotation about an eccentric center, said cam having a surface adapted to engage the surface on the reciprocable member and to apply force through surface contact to displace the reciprocable member, and means to drive the reciprocable member in the opposite direction upon release thereof by the cam.

5. In a mechanism of the kind described, a housing, a dash pot cylinder projecting therefrom, a reciprocable member within the housing, a piston on the reciprocable member operable within said cylinder, a transverse surface on the reciprocable member, resilient means to force the reciprocable member in one direction, a drive shaft disposed at right angles to the direction of reciprocation of the reciprocable member, means supporting the drive shaft on the housing, a disc on the drive shaft within the housing and adjacent the surface on the reciprocable member, a triangular cam rotatably mounted on the disc eccentrically of the drive shaft, said cam being adapted upon rotation of the drive shaft to engage the edge of said surface with one of its triangular surfaces and upon continued rotation to rotate so that said cam surface engages said member's surface in surface contact, and said return means being adapted to drive the reciprocable member in the opposite direction upon release of the reciprocable member surface by the cam.

6. In a mechanism of the kind described, a drive shaft, a cam, a member rotatable by the drive shaft, means mounting the cam on the member for rotation about its own axis which is eccentric to the drive shaft axis, a force-applying surface on the cam, a reciprocable member having a force-receiving surface and a surface portion parallel to the direction of reciprocation, said cam having its axis disposed to be displaced from one side to the other of said parallel surface portion during rotation of the drive shaft, and said cam being adapted in its rotation to cause its force-applying surface to engage the force-receiving surface as the cam is moved from one side to the other of said parallel surface portion, and to displace the reciprocable member while turning on its own axis to maintain surface contact, and then as it passes back across said parallel surface portion, said force-applying surface being adapted to release the force-receiving surface and turn to permit free return of the reciprocable member.

7. In a mechanism of the kind described, a drive shaft, a member rotatable by the drive shaft, a cam mounted on said member for rotation therewith and for rotation about its own axis eccentric to said shaft, said cam having a force-applying surface, a reciprocable member adapted to reciprocate in a direction to intersect the circle of rotation of the cam axis, said reciprocable member having a force-receiving surface transverse to the direction of reciprocation, and a surface portion at an angle thereto, free of obstacles projecting across the direction of reciprocation, said cam being adapted to cause its force-applying surface to engage the force-receiving surface of the member, to displace the member, and finally to withdraw laterally from said force-receiving surface, said surface portion at an angle to the force-receiving surface being adapted to receive the force-applying surface of the cam without obstruction to return reciprocation of the reciprocating member.

8. In a mechanism of the kind described, a drive shaft, a cam eccentrically mounted on the drive shaft and rotatable about its own axis, said cam having a surface thereon spaced from the axis and having one end of the surface at one side of the axis and the other end at the other side, so that the distance from the axis to the middle of the surface is less than the distance to an end thereof, a reciprocable member having a surface normally adapted to be contacted by the cam surface, and through which the force from the drive shaft may be translated into displacement of the reciprocable member, yieldable means urging the reciprocable member against the cam surface, said displacement being normally limited to a position from the axis of rotation of the drive shaft equal to the distance from the said axis to the axis of the cam plus the distance from the latter to the middle of the cam surface, and means limiting the stroke of the reciprocable member but adapted to permit said member to be reciprocated the distance occasioned by abnormal engagement of an end of the cam surface with the reciprocable member surface, which abnormal engagement increases the displacement by the difference in distance from the cam axis to an end of the cam surface and the distance from the cam axis to the middle of said surface.

9. In a mechanism of the kind described, a drive shaft, a cam eccentrically mounted on the drive shaft and rotatable about its own eccentric axis, a reciprocable member normally urged toward a starting position and adapted to be engaged by the cam during the rotation thereof and displaced from starting position by the cam, the cam having a force-applying surface thereon terminating at two ends, the reciprocable member having a force-receiving surface adapted to be engaged by said force-applying surface to transmit the displacing force from the cam to the member, the path of reciprocation of the member intersecting the circle of rotation of the axis of the cam, and the cam being adapted to rotate about its axis during contact of said surfaces, and upon release of the member by the cam, and said force-applying surface being so disposed relative to the reciprocating member that at the point of initial displacement of the member by the cam the distance from the axis of the cam to the force receiving surface is less than the distance from the axis of the cam to one end of the force-applying surface of the cam.

10. In a mechanism of the kind described, a rotatable drive shaft member, a reciprocable member adapted to be reciprocated by said drive shaft, and force transmitting means between the two members, said transmitting means comprising a contact surface on one member and an element on the other with a contact surface, the drive shaft member being disposed adjacent the reciprocable member to bring its surface against that on the said reciprocable member during rotation of the drive shaft, said element being mounted on its member for arcuate movement to maintain said surfaces in surface contact during the interval of engagement therebetween, and the arcuately movable member having its axis disposed opposite the contact surface on the other member, in the line of direction of the forces transmitted between the surfaces.

MILES R. WESTOVER.